(12) United States Patent
Shi et al.

(10) Patent No.: US 12,149,460 B2
(45) Date of Patent: Nov. 19, 2024

(54) WIRELESS COMMUNICATION METHOD, NETWORK DEVICE, AND TERMINAL DEVICE

(71) Applicant: GUANGDONG OPPO MOBILE TELECOMMUNICATIONS CORP., LTD., Dongguan (CN)

(72) Inventors: Zhihua Shi, Dongguan (CN); Wenhong Chen, Dongguan (CN); Yun Fang, Dongguan (CN); Zhi Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 685 days.

(21) Appl. No.: 17/246,589

(22) Filed: Apr. 30, 2021

(65) Prior Publication Data
US 2021/0258113 A1 Aug. 19, 2021

Related U.S. Application Data

(63) Continuation of application No. PCT/CN2018/114912, filed on Nov. 9, 2018.

(51) Int. Cl.
*H04B 7/022* (2017.01)
*H04L 5/00* (2006.01)
*H04W 48/12* (2009.01)
*H04W 72/0453* (2023.01)
*H04W 72/23* (2023.01)

(52) U.S. Cl.
CPC .......... *H04L 5/0032* (2013.01); *H04W 48/12* (2013.01); *H04W 72/23* (2023.01)

(58) Field of Classification Search
CPC ...... H04L 5/0032; H04W 48/12; H04W 72/23
See application file for complete search history.

(56) References Cited

U.S. PATENT DOCUMENTS 10,868,649 B2 * 12/2020 Chou ................. H04W 74/006
2015/0003384 A1 * 1/2015 Kawasaki ............... H04B 7/26
370/329

FOREIGN PATENT DOCUMENTS

| CN | 104081846 A | 10/2014 |
| CN | 104904150 A | 9/2015 |
| CN | 107734543 A | 2/2018 |
| CN | 108282285 A | 7/2018 |
| CN | 110391881 A | 10/2019 |

(Continued)

OTHER PUBLICATIONS

Extended European Search Report issued in corresponding European Application No. 18939646.8, mailed Nov. 8, 2021, 10 pages.

(Continued)

*Primary Examiner* — Yemane Mesfin
*Assistant Examiner* — Jia Hao Deng
(74) *Attorney, Agent, or Firm* — BAYES PLLC

(57) ABSTRACT

Embodiments of the present disclosure provide a wireless communication method and a device. The method includes sending, by a network device, configuration signaling to a terminal device. The configuration signaling includes multiple sets of configuration information for a first type of channel, and/or a correspondence between the multiple sets of configuration information for the first type of channel and at least one set of configuration information for a second type of channel.

20 Claims, 5 Drawing Sheets

(56) References Cited

FOREIGN PATENT DOCUMENTS

| CN | 113765630 A | * | 12/2021 | ............... | H04L 1/18 |
| EP | 3783977 A1 | | 2/2021 | | |
| EP | 4080934 A1 | * | 10/2022 | ........... | H04L 5/0005 |

OTHER PUBLICATIONS

"Multi beam transmission for DL control channel", Agenda Item: 7.2.2.6, Source: Huawei, HiSilicon, 3GPP TSG RAN WG1 Meeting #91, R1-1719811, Reno, USA, Nov. 27-Dec. 1, 2017, 4 pages.

"Multiple NR-PDCCH for Multiple TRP transmission", Agenda Item: 5.1.2.1.6, Source: Huawei, HiSilicon, 3GPP TSG RAN WG1 NR Ad Hoc Meeting, RI-1709924, Qingdao, China, Jun. 27-30, 2017, 5 pages.

"Enhancements on multi-TRP/Panel transmission", Agenda item: 7.2.8.2, Source: ZTE, 3GPP TSG RAN WG1 Meeting #95, R1-1812256, Spokane, USA, Nov. 12-16, 2018, 14 pages.

"Enabling Multiple NR-PDCCH for Multiple TRP Transmission", Agenda Item: 7.2.1.5, Source: Huawei, HiSilicon, 3GPPTSG RAN WGI Meeting #91, R1-1719816, Reno, USA, Nov. 27-Dec. 1, 2017, 3 pages.

First Office Action issued in corresponding Chinese Application No. 202110633179.4, mailed Oct. 10, 2022.

WO, International Search Report, PCT/CN2018/114912 mailed Jul. 23, 2019, 31 pages.

PCT Written Opinion of the International Searching Authority issued in corresponding International Application No. PCT/CN2018/114912 mailed Jul. 23, 2019, 9 pages.

"Enhancements on multi-TRP/panel transmission", Agenda Item: 7.2.8.2, Source: NTT DOCOMO, Inc., 3GPP TSG RAN WG1 Meeting #94bis, R1-1811348, Chengdu, China, Oct. 8-12, 2018, 21 pages.

"Multi-TRP/panel transmission enhancement for Rel-16", Agenda Item: 7.2.8.2, Source: CATT, 3GPP TSG RAN WG1 Meeting #95 R1-1812635, Spokane, USA, Nov. 12-16, 2018, 12 pages.

Second Office Action issued in corresponding European application No. 18939646.8, mailed Feb. 6, 2023.

Second Office Action issued in corresponding Chinese application No. 202110633179.4, mailed Feb. 23, 2023.

* cited by examiner

WIRELESS COMMUNICATION METHOD, NETWORK DEVICE, AND TERMINAL DEVICE

CROSS-REFERENCE TO RELATED APPLICATIONS

This application is a continuation application of International Application No. PCT/CN2018/114912, filed Nov. 9, 2018, the entire contents of which are incorporated herein by reference.

BACKGROUND

Embodiments of the present disclosure relate to communication technologies, and more particularly, to a wireless communication method, a network device and a terminal device.

In the current discussions of the New Radio (NR) system, multiple Transmitting Receiving Points (TRPs) can simultaneously communicate with a terminal device.

How to realize simultaneous transmission of the multiple TRPs is an urgent problem to be solved.

SUMMARY

Embodiments of the present disclosure provide a wireless communication method and device, which can realize simultaneous transmission of multiple TRPs.

According to a first aspect, there is provided a wireless communication method, including sending, by a network device, configuration signaling to a terminal device, wherein the configuration signaling includes multiple sets of configuration information for a first type of channel, and/or a correspondence between the multiple sets of configuration information for the first type of channel and at least one set of configuration information for a second type of channel.

According to a second aspect, there is provided a wireless communication method, including receiving, by a terminal device, configuration signaling sent from a network device, wherein the configuration signaling includes multiple sets of configuration information for a first type of channel, and/or a correspondence between the multiple sets of configuration information for the first type of channel and at least one set of configuration information for a second type of channel; and sending and/or receiving the first type of channel and/or the second type of channel according to the configuration signaling.

According to a third aspect, there is provided a network device configured to perform the method according to the first aspect.

Specifically, the network device includes functional modules configured to perform the method according to the first aspect.

According to a fourth aspect, there is provided a terminal device configured to perform the method according to the second aspect.

Specifically, the terminal device includes functional modules configured to perform the method according to the second aspect.

According to a fifth aspect, there is provided a network device, including a processor and a memory. The memory is configured to store a computer program, and the processor is configured to call and run the computer program stored in the memory to perform the method according to the first aspect.

According to a sixth aspect, there is provided a terminal device, including a processor and a memory. The memory is configured to store a computer program, and the processor is configured to call and run the computer program stored in the memory to perform the method according to the second aspect.

According to a seventh aspect, there is provided a chip configured to implement the method according to any one of the first to second aspects.

Specifically, the chip includes a processor configured to call and run a computer program stored in a memory to cause a device in which the chip is installed to perform the method according to any one of the first to second aspects.

According to an eighth aspect, there is provided a computer-readable storage medium configured to store a computer program, wherein the computer program is configured to cause a computer to perform the method according to any one of the first to second aspects.

According to a ninth aspect, there is provided a computer program product including computer program instructions that cause a computer to perform the method according to any one of the first to second aspects.

According to a tenth aspect, there is provided a computer program. When the computer program is run on a computer, the computer is caused to perform the method according to any one of the first to second aspects.

In embodiments of the present disclosure, a network device sends configuration signaling to a terminal device, and the configuration signaling includes multiple sets of configuration information for a first type of channel, and/or a correspondence between the multiple sets of configuration information for the first type of channel and at least one set of configuration information for a second type of channel. In this way, the first type of channel can be transmitted based on the multiple sets of configuration information, and accordingly simultaneous transmission of the first type of channel by multiple TRPs (or multiple beams or multiple antenna panels) can be implemented.

DETAILED DESCRIPTION

Technical solutions in embodiments of the present disclosure will be described below with reference to drawings.

The described embodiments are a part of the embodiments of the present disclosure, not all of the embodiments of the present disclosure. Based on the embodiments described herein, all other embodiments obtained by those of ordinary skill in the art without creative work shall fall within the protection scope of the present disclosure.

The technical solutions of embodiments of the present disclosure can be applied to various communication systems, such as: a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system or a 5G system, etc.

Figure 1:
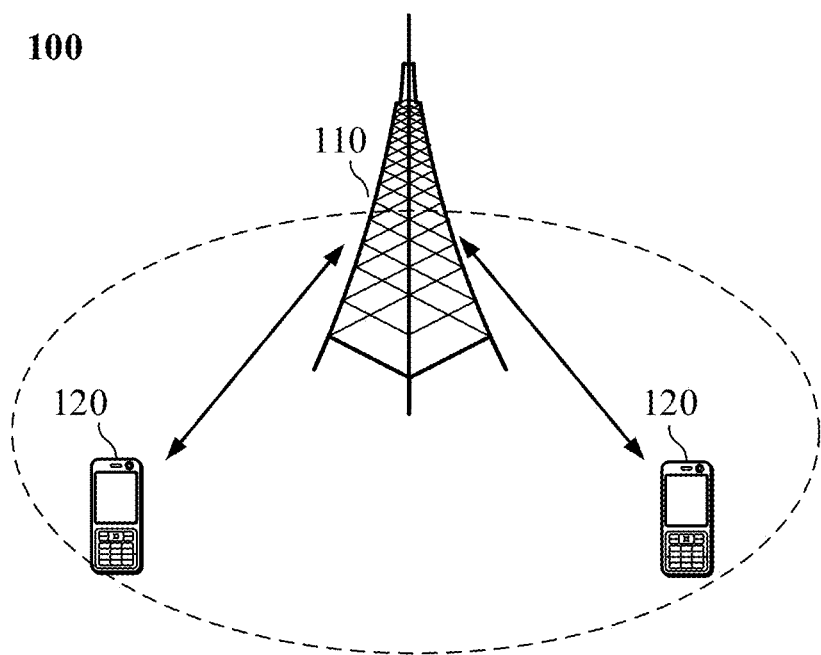
FIG. 1 is a schematic diagram of communication system architecture according to an embodiment of the present disclosure.

As an example, the communication system 100 applied in embodiments of the present disclosure may be as shown in FIG. 1. The communication system 100 includes a network device 110, and the network device 110 may be a device that communicates with a terminal device 120 (or called a communication terminal or a terminal). The network device 110 can provide communication coverage for a specific geographic area, and can communicate with terminal devices in the coverage area. According to embodiments, the network device 110 may be a base station (Base Transceiver Station, BTS) in a GSM system or a CDMA system, a base station (NodeB, NB) in a WCDMA system, an evolved base station (Evolutional Node B, eNB or eNodeB) in an LTE system, or a wireless controller in a Cloud Radio Access Network (CRAN), or the network device may be a mobile switching center, a relay station, an access point, an on-vehicle device, a wearable device, a hub, a switch, a network bridge, a router, a network side device in a 5G network, or a network device in a future evolved Public Land Mobile Network (PLMN), etc.

The communication system 100 also includes at least one terminal device 120 within the coverage area of the network device 110. The "terminal device" as used herein may be connected in the following manners (including but not limited to): the terminal device may be connected via wired lines, such as via Public Switched Telephone Networks (PSTN), Digital Subscriber Line (DSL), digital cables, and direct cable connections; and/or the terminal may be connected via another data connection/network; and/or the terminal device may be connected via a wireless interface, such as cellular networks, wireless local area network (WLAN), digital TV networks such as DVB-H networks, satellite networks, AM-FM broadcast transmitter; and/or the terminal device is connected via a device of another terminal device which is configured to receive/send communication signals; and/or the terminal device is connected via an Internet of Things (IoT) device. A terminal device set as communicating through a wireless interface may be referred to as a "wireless communication terminal", a "wireless terminal" or a "mobile terminal". Examples of the mobile terminal include but are not limited to: satellite or cellular phone; Personal Communications System (PCS) terminal that can integrate a cellular radio phone with data processing, fax, and data communication capabilities; a PDA which can include a radio phone, a pager, an Internet/intranet access, a Web browser, a memo pad, a calendar, and/or Global Positioning System (GPS) receiver; and conventional laptop and/or palmtop receivers or other electronic device including a radio telephone transceiver. The terminal device can refer to access terminal, User Equipment (UE), user unit, user station, mobile station, mobile device, remote station, remote terminal, mobile equipment, user terminal, terminal, wireless communication equipment, user agent or user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable device, a terminal device in 5G networks, or a terminal device in the future evolved PLMN, etc.

According to embodiments, Device to Device (D2D) communication may be performed between the terminal devices 120.

According to embodiments, the 5G system or 5G network may also be referred to as a New Radio (NR) system or NR network.

FIG. 1 exemplarily shows one network device and two terminal devices. According to other embodiments, the communication system 100 may include multiple network devices and the coverage of each network device may include other numbers of terminal devices, and embodiments of the present disclosure do not impose specific limitations on this.

According to embodiments, the communication system 100 may also include other network entities such as a network controller and a mobility management entity, and embodiments of the present disclosure do not impose specific limitations on this.

It should be understood that the devices with communication functions in the network/system in embodiments of the present disclosure may be referred to as communication devices. Taking the communication system 100 shown in FIG. 1 as an example, the communication devices may include the network device 110 and the terminal devices 120 with communication functions, and the network device 110 and the terminal devices 120 may be the devices described above, which will not be repeated here. The communication devices may also include other devices in the communication system 100, such as other network entities such as a network controller or a mobility management entity, and embodiments of the present disclosure do not impose specific limitations on this.

It should be understood that the terms "system" and "network" are often used interchangeably herein. The term "and/or" herein describes an association relationship between associated objects, which means that there can be three relationships, for example, "A and/or B" can mean: A alone, B alone, and A and B together. In addition, the character "/" herein generally indicates that the associated objects before and after "/" are in an "or" relationship.

Figure 2:
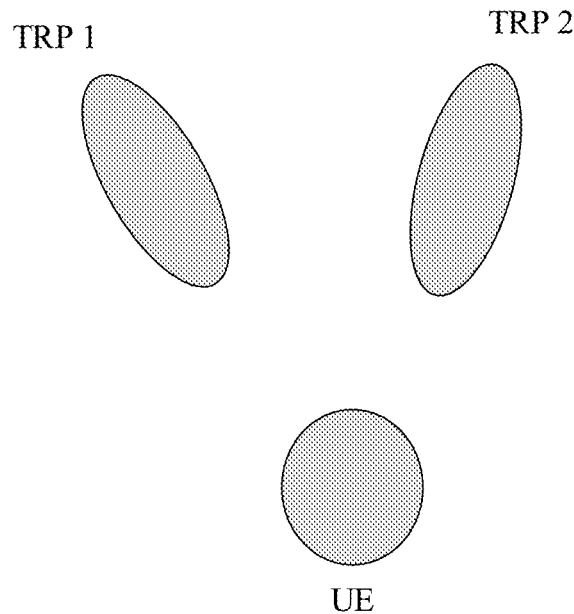
FIG. 2 is a schematic diagram showing sending of multiple downlink control channels according to an embodiment of the present disclosure.
Figure 3:
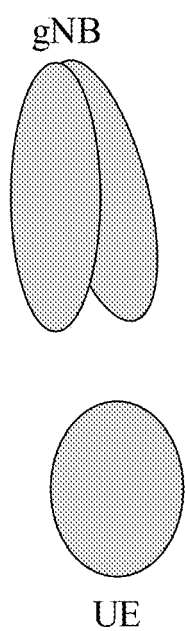
FIG. 3 is another schematic diagram showing sending of multiple downlink control channels according to an embodiment of the present disclosure.

In the New Radio (NR) system, multiple Transmitting Receiving Points (TRPs) or multiple beams can communicate with a terminal device at the same time. For example, as shown in FIG. 2, TRP1 and TRP2 can simultaneously communicate with a terminal device, and as shown in FIG. 3, a base station (gNB) can use multiple beams to communicate with a terminal device. The following communication methods can be used.

In a first method, a UE only receives one PDCCH, and this PDCCH indicates indication information of data transmitted on multiple TRPs/beams.

In a second method, a UE receives different PDCCHs from different TRPs/beams, and each PDCCH indicates indication information of a corresponding data transmission.

The second method can be applied to the following scenarios.

Scenario 1: Multiple TRPs belong to the same cell, and the connection (backhaul) between TRPs is ideal (that is, multiple TRPs can exchange information quickly and dynamically exchange information).

Scenario 2: Multiple TRPs belong to the same cell, and the connection (backhaul) between TRPs is not ideal (that is, multiple TRPs cannot exchange information quickly, and can only perform relatively slow data exchange).

Scenario 3: Multiple TRPs belong to different cells, and the connection (backhaul) between TRPs is ideal.

Scenario 4: Multiple TRPs belong to different cells, and the connection (backhaul) between TRPs is not ideal.

The four application scenarios of the second method are introduced above with TRP as an example. The above four scenarios can also be used in a multi-beam scenario, and for brevity, details are not described here.

Figure 4:
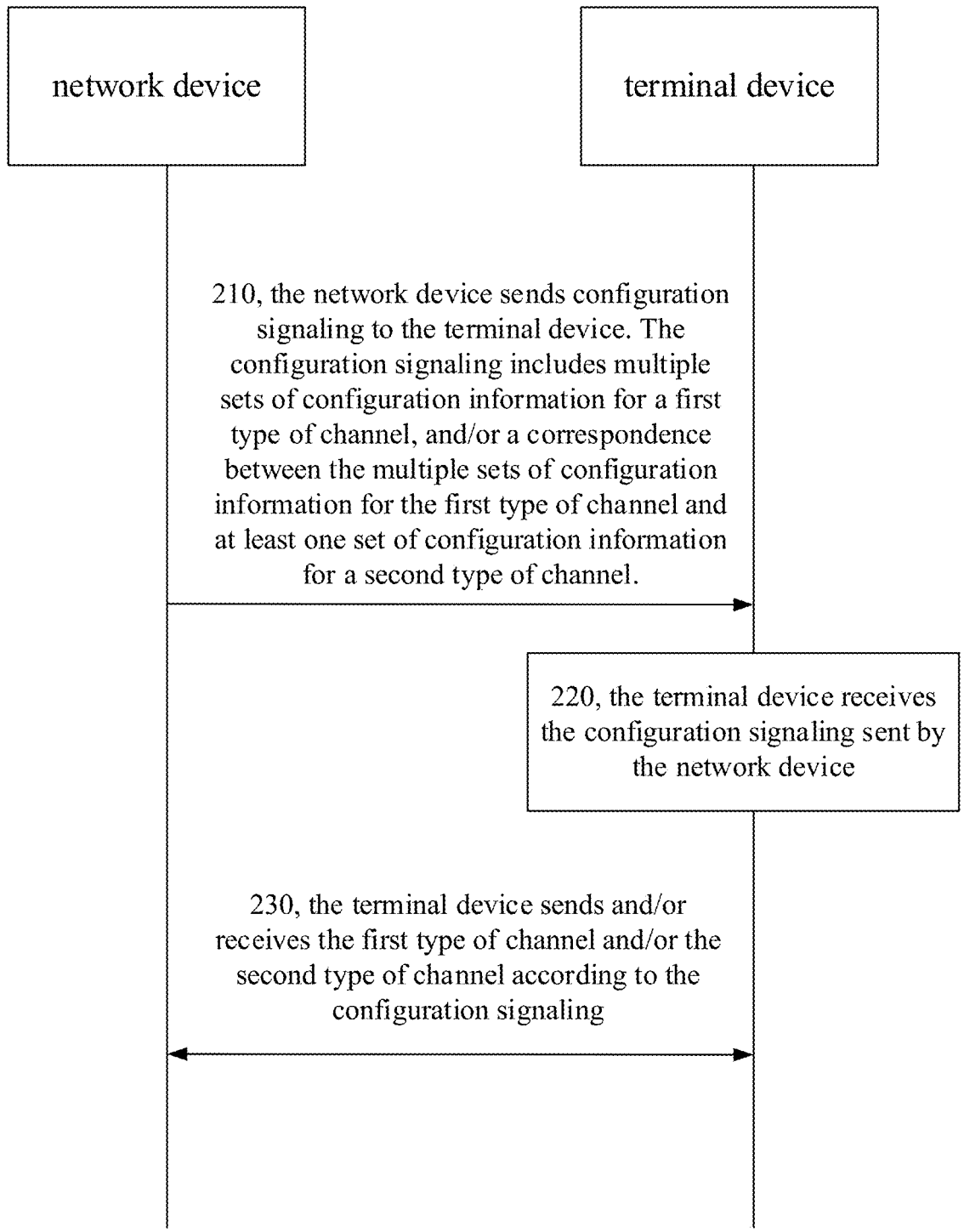
FIG. 4 is a schematic diagram of a wireless communication method according to an embodiment of the present disclosure.

FIG. 4 is a schematic flowchart of a wireless communication method 200 according to an embodiment of the present disclosure. The method 200 includes at least part of the following contents.

In 210, a network device sends configuration signaling to a terminal device. The configuration signaling includes multiple sets of configuration information for a first type of channel, and/or a correspondence between the multiple sets of configuration information for the first type of channel and at least one set of configuration information for a second type of channel. The first type is different from the second type.

In embodiments of the present disclosure, the channel types between the terminal device and the network device can be divided into the following: Physical Uplink Shared Channel (PUSCH), Physical Downlink Shared Channel (PDSCH), Physical Downlink Control Channel (PDCCH), or Physical Uplink Control Channel (PUCCH).

The first type of channel in embodiments of the present disclosure may be PUSCH, PUCCH, PDSCH or PUSCH, and the second type of channel in embodiments of the present disclosure may be PUSCH, PUCCH, PDSCH or PUSCH.

In some embodiments of the present disclosure, there may be multiple sets of configuration information for the first type of channel, and the multiple sets of configuration information may have the same type of configuration, and the same type of configuration may have different Configuration values.

In some embodiments of the present disclosure, there may be at least one set of configuration information for the second type of channel. When there are multiple sets of configuration information, the multiple sets of configuration information may have the same type of configuration, and the same type of configuration may have different configuration values.

In some embodiments of the present disclosure, the correspondence includes one or more of the following: a correspondence between multiple sets of configuration information for PDCCH and multiple sets of configuration information for PDSCH; a correspondence between multiple sets of configuration information for PDCCH and one set of configuration information for PDSCH; a correspondence between one set of configuration information for PDCCH and multiple sets of configuration information for PDSCH; a correspondence between multiple sets of configuration information for PDCCH and multiple sets of configuration information for PUSCH; a correspondence between multiple sets of configuration information for PDCCH and one set of configuration information for PUSCH; a correspondence between one set of configuration information for PDCCH and multiple sets of configuration information for PUSCH; a correspondence between multiple sets of configuration information for PDCCH and multiple sets of configuration information for PUCCH; a correspondence between multiple sets of configuration information for PDCCH and one set of configuration information for PUCCH; or a correspondence between one set of configuration information for PDCCH and multiple sets of configuration information for PUCCH.

The configuration signaling indicates the correspondence by positions of the multiple sets of configuration information for the first type of channel in the configuration signaling and positions of the at least one set of configuration information for the second type of channel in the configuration signaling.

Specifically, the configuration signaling may include multiple sets of configuration information for the first type of channel, and at least one set of configuration information for the second type of channel. The configuration signaling may indicates the correspondence by positions of the multiple sets of configuration information for the first type of channel in the configuration signaling and positions of the at least one set of configuration information for the second type of channel in the configuration signaling.

For example, the first type of channel is PDCCH, the number of sets of configuration information sets is three, the second type of channel is PDSCH, and the number of sets of configuration information is two. Two sets of configuration information in the three sets of configuration information for the first type of channel which are located at two specific positions may correspond to one set of configuration information for the second type of channel which is located at one specific position, and the remaining set of configuration information in the three sets of configuration information for the first type of channel which is located at another specific position may correspond to the remaining set of configuration information for the second type of channel which is located at another specific position.

In some embodiments of the present disclosure, the configuration signaling indicates the correspondence by name fields of the multiple sets of configuration information for the first type of channel in the configuration signaling and a name field of the at least one set of configuration information for the second type of channel in the configuration signaling.

Specifically, the configuration signaling may include multiple sets of configuration information for the first type of channel, and at least one set of configuration information for the second type of channel. For each set of configuration information, there may be a name field, which can indicate the correspondence.

For example, the first type of channel is PDCCH, the number of sets of configuration information is three, the second type of channel is PDSCH, and the number of sets of configuration information is two. The names before the three sets of configuration information for PDCCH can be 1, 2 and 2, and the names before the two sets of configurations for PDSCH can be 1 and 2. Accordingly, it can be determined that the first set of configuration information for PDCCH corresponds to the first set of configuration information for PDSCH, and the second and third sets of configuration information for PDCCH corresponds to the second set of configuration information for PDSCH.

Alternatively, the configuration signaling indicates configuration information for the second type of channel by carrying or not carrying a bit and/or a value of the bit in configuration information for the first type of channel.

Specifically, the configuration signaling may include multiple sets of configuration information for the first type of channel, and each set of configuration information may carry a bit, and the value of the bit may indicate corresponding configuration information for the second type of channel. Or, in the multiple sets of configuration information for the first type of channel, some of sets of the configuration information carries the bit, which can indicate that the configuration information corresponds to one set of configuration information for the second type of channel; some sets of configuration information does not carry the bit, which can indicate that the configuration information corresponds to another set of configuration information for the second type of channel.

Alternatively, the configuration signaling includes a dedicated domain dedicated to indicating the correspondence.

In some embodiments of the present disclosure, in the case that the configuration signaling includes the correspondence between multiple sets of configuration information for the first type of channel and at least one set of configuration information for the second type of channel, the configuration signaling may further carry the multiple sets of configuration information for the first type of channel and/or the at least one set of configuration information for the second type of channel.

It should be understood that in embodiments of the present disclosure, if a certain type of channel has multiple sets of configuration information, it can be understood that channels transmitted using different sets of configuration information in the multiple sets of configuration information are different channels. For example, for PDCCH, if there can be multiple sets of configuration information for the PDCCH, it can be understood that the number of PDCCHs is more than one, and each PDCCH corresponds to one set of configuration information. Alternatively, the PDCCH can be understood as one PDCCH, and there are multiple sets of configuration information can be used for the PDCCH.

In embodiments of the present disclosure, multiple beams, multiple Transmission Reception Points (TRPs), or multiple antenna panels are used to implement transmission or reception of the first type of channel based on the multiple sets of configuration information. The multiple beams, multiple TRPs, or multiple antenna panels are in one-to-one correspondence with the multiple sets of configuration information, and each beam, TRP or antenna panel uses a corresponding set of configuration information to transmit or receive the first type of channel. The multiple beams or multiple antenna panels mentioned here can be multiple beams or multiple antenna panels used for transmission or reception on the terminal device side, or multiple beams or multiple antenna panels used for transmission or reception on the network device side.

In some embodiments of the present disclosure, a single carrier (even if TRPs belong to different cells, the frequencies of the TRPs may have overlapping parts) is used to implement transmission or reception of the first type of channel based on the multiple sets of configuration information.

In order to make the present disclosure more clear, the following will describe embodiments of the present disclosure taking the first type of channel which is PDCCH, PDSCH, PUSCH, or PUCCH as examples.

In an implementation, first type of channel is a Physical Downlink Control Channel (PDCCH), and each of the multiple sets of configuration information includes at least one of the following: a search space/control resource set group which a search space/control resource set for the PDCCH belongs to; or a HARQ process group corresponding to the PDCCH.

In some embodiments of the present disclosure, the number of sets of configuration information is equal to the number of search space/control resource set groups, and different sets of configuration information indicate different search space/control resource set groups.

Specifically, the configuration signaling may configure multiple search space/control resource groups, and the multiple search space/control resource groups may correspond to multiple TRPs, multiple antenna panels, or multiple beams one to one. That is, each TRP, antenna panel or beam can use a corresponding search space/control resource group to perform DCI transmission or detection.

The search space/control resource set group in embodiments of the present disclosure may refer to a search space group or a control resource set group, and each search space/control resource set group may include at least one search space/control resource set.

The search space in embodiments of the present disclosure may also be referred to as a search space set. In this case, a search space group may include at least one search space or search space set.

Each search space in embodiments of the present disclosure can be associated with a Control Resource Set (CORESET), a control resource set can be associated with one or more search spaces, and different search spaces can be associated with different control resource sets.

A control resource set may indicate the time domain size, the frequency domain size and location of a resource set, and the time domain location may be indicated by the search space.

In some embodiments of the present disclosure, each search space/control resource set group is used to send one uplink grant and/or one downlink grant.

When a downlink (DL) grant is detected by the terminal device in each search space/control resource set group, the terminal device stops performing DL grant detection in each search space/control resource set group; and/or, when an uplink (UL) grant is detected by the terminal device in each search space/control resource set group, the terminal stops perform UL grant detection in each search space/control resource set group.

When a downlink (DL) grant is detected by the terminal device in a search space/control resource set group corresponding to a certain downlink control channel, if no UL grant is detected in the search space/control resource set group, the terminal device can continue to detect the UL grant, or the terminal device can detect only the DL grant in the search space/control resource set group, but does not detect the UL grant.

Similarly, when a UL grant is detected by the terminal device in the search space/control resource set group corresponding to a certain downlink control channel, if no DL grant is detected in the search space/control resource set group, the terminal device can continue to detect the DL grant, or the terminal device can detect only the UL grant in the search space/control resource set group, but does not detect the DL grant.

Alternatively, whether the terminal device needs to detect both DL grant and UL grant in a search space/control resource set group corresponding to a certain downlink control channel can be determined based on the configuration of the search space/control resource group.

For example, when a certain search space/control resource set group is configured to send a uplink grant, the detection can be stopped when an uplink grant is detected. When a certain search space/control resource set group is configured to send a downlink grant, the detection can be stopped when a downlink grant is detected. When a certain search space/control resource set group is configured to send both uplink grant and downlink grant, detection can be stopped when one uplink grant and one downlink grant are detected.

Here, single carrier is considered (even if TRPs belong to different cells, there may be overlapping parts in their frequencies). Under such condition, a downlink control channel carries an uplink grant and/or downlink grant. For a carrier set, and cross-carrier scheduling, a search space/control resource set group can be used to detect multiple downlink grants (and/or downlink grants), and different downlink grants (and/or downlink grants) correspond to Physical Downlink Shared Channel (PDSCH) scheduling (and/or Physical Uplink Shared Channel (PUSCH) scheduling) on different carriers.

It should be understood that in embodiments of the present disclosure, the concept of search space/control resource set group may not exist on the terminal device side. When performing specific configuration, the network device may configure the downlink control channel which each search space/control resource set is used to detect, or configure the search space/control resource set corresponding to each downlink control channel. That is, configuring the group to which the search space/control resource set belongs means configuring the downlink control channel which the search space/control resource set is used to detect. However, the search space/control resource set corresponding to a downlink control channel can be understood as a search space/control resource set group.

In embodiments of the present disclosure, each search space/control resource set group is associated with one HARQ process group, and different search space/control resource groups are associated with different HARQ process groups.

When Downlink Control Information (DCI) is detected by the terminal device in a search space/control resource set group, the terminal device determines that the process indicated by the process number in the DCI belongs to the one HARQ process group associated with the search space/control resource set group.

In this case, because different search space/control resource groups are associated with different HARQ process groups, when the same process number exists in different HARQ process groups, the DCI detected in different search space/control resource groups may have the same process number. The HARQ process group to which the process number in the DCI belongs can be determined according to the search space/control resource group where the DCI is. Therefore, the embodiment can avoid the problem that processes cannot be distinguished because different TRPs, antenna panels, or beams use the same process number.

According to some embodiments, for HARQ process in a HARQ process group, when performing data transmission, the transmission for a next HARQ process can be performed without waiting for transmission feedback of a HARQ process.

In embodiments of the present disclosure, the number of HARQ processes in each HARQ process group may be more than one, for example, there may be sixteen or eight HARQ processes.

In embodiments of the present disclosure, each search space/control resource set group is associated with one piece of scrambling information used to scramble the PDSCH and/or PUSCH. Different search space/control resource set groups are associated with different scrambling information used to scramble the PDSCH and/or PUSCH.

When Downlink Control Information (DCI) is detected in a search space/control resource set group, the terminal device determines that the PDSCH or PUSCH scheduled by the DCI is scrambled by one piece of scrambling information associated with the search space/control resource set group. The scrambling information is used to determine an initial value of a scrambling sequence used to transmit the PDSCH or PUSCH.

In another implementation, the first type of channel is a Physical Downlink Shared Channel (PDSCH) or a Physical Uplink Shared Channel (PUSCH), and each set of configuration information in the multiple sets of configuration information includes scrambling information used for sending the PDSCH or PUSCH. The scrambling information is used to determine an initial value of a scrambling sequence used to send the PDSCH or PUSCH.

In some embodiments, the multiple sets of scrambling information may be associated with one search space/control resource group, that is, the PUSCH or PDSCH scheduled by the PDCCH sent by one search space/control resource group may be scrambled by multiple sets of scrambling information.

In another implementation, the first type of channel is PUCCH, and each set of configuration information in the multiple sets of configuration information may include: a set of PUCCH resources for transmitting PUCCH. A set of PUCCH resources may include multiple PUCCH resources, and each PUCCH resource can be used to send PUCCH separately.

In some embodiments, each set of PUCCH resources can be associated with one search space/control resource group, and different sets of PUCCH resources can be associated with different search space/control resource groups.

When a PDCCH is detected by the terminal device in a search space/control resource group, the terminal device can receive the PUSCH scheduled by the PDCCH, and the feedback for the PUSCH can use one PUCCH resource in a set of PUCCH resources corresponding to the search space/control resource group.

In some embodiments, each set of PUCCH resources can be associated with a set of PDSCH configurations, and different sets of PUCCH resources can be associated with different sets of PDSCH configurations.

When receiving the PDSCH, the terminal device may send feedback for the PDSCH based on one PUCCH resource in a set of PUCCH resources corresponding to the configuration of the PDSCH.

The above describes the association relationship of the configuration information for different types of channels. The association relationship (also referred to as the correspondence) may be indicated by configuration signaling, or may be preset in the terminal device based on a protocol.

In some embodiments of the present disclosure, the multiple sets of configuration information are carried in multiple configuration domains, and each configuration domain is used to carry a set of configuration information.

In some other embodiments of the present disclosure, the multiple sets of configuration information are carried in one configuration domain.

The configuration domain is a PDSCH-configuration (PDSCH-config) domain, a PDSCH-common configuration (PDSCH-configCommon) domain, a PDCCH-configuration (PDCCH-config) domain, a PDCCH-common configuration (PDCCH-configCommon) domain, a PUSCH-configuration (PUSCH-config) domain, a PUSCH-common configuration (PUSCH-configCommon) domain, a PUCCH-configuration (PUCCH-config) domain, a PUCCH-common configuration (PUCCH-configCommon) domain.

In some embodiments of the present disclosure, the configuration signaling is configuration signaling for a specific Band Width Part (BWP).

In 220, the terminal device receives the configuration signaling sent by the network device.

In 230, the terminal device sends and/or receives the first type of channel and/or the second type of channel according to the configuration signaling.

Specifically, if the configuration information carries multiple sets of configuration information for the first type of channel, the terminal device can use the multiple sets of configuration information to receive the first type of channel. The received first type of channel may come from multiple TRPs, or can be sent from different antenna panels or beams of the same base station. Or the terminal device can use the multiple sets of configuration information to send the first type of channel. The terminal device can use different TRPs or beams to send the first type of channel based on different configuration information.

If the first configuration information carries multiple sets of configuration information for the first type of channel, the terminal device may determine the configuration information for the current second type of channel based on the multiple sets of configuration information and the correspondence between the multiple sets of configurations and at least one set of configuration information for the second type of channel, in order to realize the transmission of the second type of channel. The correspondence and at least one set of configuration information for the second type of channel can be carried in the configuration signaling, carried in other signaling, or can be preset on the terminal device based on a protocol.

If the first configuration information carries the correspondence between multiple sets of configuration information for the first type of channel and at least one set of configuration information for the second type of channel, the terminal device may determine the configuration information for the current second type of channel based on the configuration information for the current first type of channel, so as to realize sending or receiving of the second type of channel. The multiple sets of configuration information for the first type of channel and at least one set of configuration information for the second type of channel can be carried in the configuration signaling, or carried in other signaling, or can be preset on the terminal device based on a protocol.

If the first configuration information carries the correspondence between multiple sets of configuration information for the first type of channel and at least one set of configuration information for the second type of channel, the terminal device may determine the configuration information for the current first type of channel based on the configuration information for the current second type of channel, so as to realize sending or receiving of the first type of channel. The multiple sets of configuration information for the first type of channel and at least one set of configuration information for the second type of channel can be carried in the configuration signaling, or carried in other signaling, or can be preset on the terminal device based on a protocol.

In order to facilitate understanding of the present disclosure, the present disclosure will be described below in conjunction with exemplary embodiments.

First Exemplary Embodiment. The network device can configure multiple pieces of configuration information corresponding to the PDCCH in one BWP, that is, the network device can configure pdcch-Config (for example, a list structure, or multiple domains similar to pdcch-Config). Several implementations are described below.

In an implementation 1), the configuration information for the PDCCH can be implemented in the following manner.

| | |
|---|---|
| BWP-DownlinkDedicated ::= | SEQUENCE { |
| pdcch-Config | SetupRelease { PDCCH-Config } |
| OPTIONAL, -- Need M | |
| pdsch-Config | SetupRelease { PDSCH-Config } |
| OPTIONAL, -- Need M | |
| sps-Config | SetupRelease { SPS-Config } |
| OPTIONAL, -- Need M | |
| radioLinkMonitoringConfig | SetupRelease { RadioLinkMonitoringConfig } |
| OPTIONAL, -- Need M | |
| pdcch-Config1 | SetupRelease { PDCCH-Config } (optional) |
| ... | |
| } | |

In the above implementation, the position and order of the configuration information for PDCCH is not limited, that is, the configuration information can be in other positions.

In implementation 2), the configuration information for the PDCCH can be implemented in the following manner.

```
BWP-DownlinkDedicated ::=      SEQUENCE {
    pdcch-Config               SetupRelease { PDCCH-Config }
OPTIONAL, -- Need M
    pdsch-Config               SetupRelease { PDSCH-Config }
OPTIONAL, -- Need M
    sps-Config                 SetupRelease { SPS-Config }
OPTIONAL, -- Need M
    radioLinkMonitoringConfig  SetupRelease { RadioLinkMonitoringConfig }
OPTIONAL, -- Need M
    pdcch-Config1              SetupRelease { PDCCH-Config1 } (optional)
    ...
}
```

For different PDCCH configurations, the UE can know the search space configured by the network device. It is assumed that the search space corresponding to the pdcch_Config configuration is denoted as group X, and the search space corresponding to the pdcch_Config1 configuration is denoted as group Y (here, for simplicity of description, it is assumed that there are two groups, and according to some other embodiments, there can be more groups).

The behaviors of the UE to detect the PDCCH may be as follows:

1) UE performs detection in the search space belonging to group X. If one DL grant is detected (here, for simplicity of description, a single carrier scenario is considered. If carrier aggregation (CA) and cross-carrier scheduling is adopted, it may be necessary to detect T DL grants according to configurations, and different DL grants correspond to PDSCH scheduling on different carriers), the UE can do some optimizing processing, for example, stopping detection of DL grants to save power consumption.

2) The UE performs similar operations for the search space belonging to group Y.

The physical implementations of the above example can be as follows. The search space belonging to group X corresponds to the PDCCH transmitted on TRP A, and the search space belonging to group Y corresponds to the PDCCH scheduling transmitted on TRP B.

Therefore, such implementations can ensure that the UE tries to detect two DL grants, and can reduce the processing of the UE and save power consumption. This is because if the network device informs the UE to detect two DL grants, or stipulates that the UE detects two grants, and there is no the above-mentioned groups, the UE needs to try to detect two DCIs in all search spaces. But, using the above implementations, if one DCI is detected in one group, there is no need to continue to detect the second DCI in this group.

The processing for the HARQ process can be as follows:

1) If the DCI for scheduling a PDSCH/PUSCH belongs to a certain search space SS X, and the group corresponding to SS X is group A, then the HARQ process number a corresponding to the scheduled PDSCH/PUSCH corresponds to a HARQ process number in a certain group M (the search space group A corresponds to the HARQ process group M).

2) If the DCI for scheduling a PDSCH/PUSCH belongs to a certain search space SS Y, and the group corresponding to SS Y is group B, then the HARQ process number b corresponding to the scheduled PDSCH/PUSCH corresponds to a HARQ process number in a certain group N (the search space group B corresponds to the HARQ process group N).

Therefore, even if the HARQ process number a and the HARQ process number b have the same value, they still represent different HARQ processes, because they belong to different HARQ process groups, the problem of process ambiguity can be avoided.

Second Exemplary Embodiment. On the basis of the First Exemplary Embodiment, the following content can be added: two pieces of scrambling information (dataScramblingIdentityPDSCH) are configured in the PDSCH related configurations. The two pieces of scrambling information can be associated with two sets of PDCCH configurations. The specific association method has the following options:

1) The association can be directly stipulated in a protocol. For example, a new PDCCH configuration corresponds to new scrambling information, or the association is determined according to the positions of the PDCCH configuration information and the scrambling information in the configuration signaling, or the association is determined according to the name fields of the PDCCH configuration information and the scrambling information in the configuration information.

2) The corresponding scrambling information is indicated in the PDCCH configuration information. If there is no relevant indication information, the PDCCH configuration information corresponds to a certain scrambling information by default.

If the DCI for scheduling a PDSCH/PUSCH is detected in a search space corresponding to a certain PDCCH configuration X, the scrambling information Z corresponding to PDCCH configuration X is used for data scrambling, and the configuration information Z is optionally used for determining the initial value of the scrambling sequence.

Third Exemplary Embodiment. On the basis of the First Exemplary Embodiment, the following contents can be added: the network device configures two PDSCH-related configurations (for example, PDSCH-Config and PDSCH-Config1). The correspondence between the two configurations for PDSCH and the two configurations for PDCCH can have the following options:

1) The correspondence can be directly stipulated by a protocol. For example, a new PDCCH configuration corresponds to a new PDSCH configuration, or the correspondence is determined according to the positions of the PDCCH configuration information and PDSCH information in the configuration signaling, or the correspondence is determined according to the name fields of the PDCCH configuration information and PDSCH information in the configuration information.

2) The PDCCH configuration carries information, indicating the PDSCH configuration information which the PDCCH configuration corresponds to.

3) The PDSCH configuration carries information, indicating the PDCCH configuration information which the PDSCH configuration corresponds to.

4) The network indicates the correspondence between PDCCH configuration and PDSCH configuration in the BWP configuration information.

In options 2)-4), when there is no relevant indication (or when some indications are not available), a default correspondence can be adopted.

Fourth Exemplary Embodiment. The network device configures different groups of search space and/or different groups of CORESET in a PDCCH configuration.

In a PDCCH configuration pdcch-Config, the network device can configure different groups of search space and/or different groups of CORESET.

In implementation 1), the configuration for the search space can be as follows:

```
PDCCH-Config ::=                          SEQUENCE {
    controlResourceSetToAddModList            SEQUENCE(SIZE (1..3)) OF ControlResourceSet
        OPTIONAL, -- Need N
    controlResourceSetToReleaseList           SEQUENCE(SIZE (1..3)) OF ControlResourceSetId
        OPTIONAL, -- Need N
    searchSpacesToAddModList                  SEQUENCE(SIZE (1..10)) OF SearchSpace
        OPTIONAL, -- Need N
    searchSpacesToReleaseList                 SEQUENCE(SIZE (1..10)) OF SearchSpaceId
        OPTIONAL, -- Need N
    downlinkPreemption                        SetupRelease { DownlinkPreemption }
        OPTIONAL, -- Need M
    tpc-PUSCH                                 SetupRelease { PUSCH-TPC-CommandConfig }
        OPTIONAL, -- Need M
    tpc-PUCCH                                 SetupRelease { PUCCH-TPC-CommandConfig }
        OPTIONAL, -- Cond PUCCH-CellOnly
    tpc-SRS                                   SetupRelease { SRS-TPC-CommandConfig}
        OPTIONAL, -- Need M
    searchSpaces1ToAddModList                 SEQUENCE(SIZE (1..10)) OF SearchSpace
        OPTIONAL, (optional)
    searchSpaces1ToReleaseList                SEQUENCE(SIZE (1..10) OF SearchSpaceId
        OPTIONAL, (optional)
    ...
}
```

In the following implementation 2), the configuration for the control resource set can be as follows:

```
PDCCH-Config ::=                          SEQUENCE {
    controlResourceSetToAddModList            SEQUENCE(SIZE (1..3)) OF ControlResourceSet
        OPTIONAL, -- Need N
    controlResourceSetToReleaseList           SEQUENCE(SIZE (1..3)) OF ControlResourceSetId
        OPTIONAL, -- Need N
    searchSpacesToAddModList                  SEQUENCE(SIZE (1..10)) OF SearchSpace
        OPTIONAL, -- Need N
    searchSpacesToReleaseList                 SEQUENCE(SIZE (1..10)) OF SearchSpaceId
        OPTIONAL, -- Need N
    downlinkPreemption                        SetupRelease { DownlinkPreemption }
        OPTIONAL, -- Need M
    tpc-PUSCH                                 SetupRelease { PUSCH-TPC-CommandConfig }
        OPTIONAL, -- Need M
    tpc-PUCCH                                 SetupRelease { PUCCH-TPC-CommandConfig }
        OPTIONAL, -- Cond PUCCH-CellOnly
    tpc-SRS                                   SetupRelease { SRS-TPC-CommandConfig}
        OPTIONAL, -- Need M
    controlResourceSet1ToAddModList           SEQUENCE(SIZE (1..3)) OF ControlResourceSet
        OPTIONAL, (optional)
    controlResourceSet1ToReleaseList          SEQUENCE(SIZE (1..3)) OF ControlResourceSetId
        OPTIONAL, (optional)
    ...
}
```

In the following implementation 3), the configurations for the search space and the control resource set can be as follows:

```
PDCCH-Config ::=                          SEQUENCE {
    controlResourceSetToAddModList            SEQUENCE(SIZE (1..3)) OF ControlResourceSet
        OPTIONAL, -- Need N
    controlResourceSetToReleaseList           SEQUENCE(SIZE (1..3)) OF ControlResourceSetId
        OPTIONAL, -- Need N
    searchSpacesToAddModList                  SEQUENCE(SIZE (1..10)) OF SearchSpace
```

```
            OPTIONAL, -- Need N
                searchSpacesToReleaseList        SEQUENCE(SIZE (1..10)) OF SearchSpaceId
            OPTIONAL, -- Need N
                downlinkPreemption               SetupRelease { DownlinkPreemption }
            OPTIONAL, -- Need M
                tpc-PUSCH                        SetupRelease { PUSCH-TPC-CommandConfig }
            OPTIONAL, -- Need M
                tpc-PUCCH                        SetupRelease { PUCCH-TPC-CommandConfig }
            OPTIONAL, -- Cond PUCCH-CellOnly
                tpc-SRS                          SetupRelease { SRS-TPC-CommandConfig}
            OPTIONAL, -- Need M
                controlResourceSet1ToAddModList  SEQUENCE(SIZE (1..3)) OF ControlResourceSet
            (optional)
                controlResourceSet1ToReleaseList SEQUENCE(SIZE (1..3)) OF ControlResourceSetId
            (optional)
                searchSpaces1ToAddModList        SEQUENCE(SIZE (1..10)) OF SearchSpace
            (optional) N
                searchSpaces1ToReleaseList       SEQUENCE(SIZE (1..10)) OF SearchSpaceId
            (optional)
                ...
        }
```

According to the configurations for different groups of search space and/or CORESET, the UE can divide the search spaces into two groups, denoted as group X and group Y, respectively. For group X and group Y, the UE's behaviors for detecting the PDCCH and processing the HARQ can be found in previous descriptions, and repeated descriptions are not provided here.

Fifth Exemplary Embodiment. On the basis of the Fourth Exemplary Embodiment, the following content can be added: two pieces of scrambling information (dataScramblingIdentityPDSCH) are configured in the PDSCH related configurations. The two pieces of scrambling information can be associated with different groups of search space and/or different groups of CORESET.

The specific association method has the following options:

1) The association can be directly stipulated in a protocol. For example, a new PDCCH configuration corresponds to new scrambling information, or the association is determined according to the positions of the PDCCH configuration information and the scrambling information in the configuration signaling, or the association is determined according to the name fields of the PDCCH configuration information and the scrambling information in the configuration signaling.

2) The corresponding scrambling information is indicated in the PDCCH configuration information. If there is no relevant indication information, the PDCCH configuration information corresponds to a certain scrambling information by default.

If the DCI for scheduling a PDSCH/PUSCH is detected in a search space corresponding to a certain group X, the scrambling information Z corresponding to PDCCH configuration X is used for data scrambling, and the configuration information Z is used for determining the initial value of the scrambling sequence.

Sixth Exemplary Embodiment. On the basis of the Fourth Exemplary Embodiment, the following contents can be added: the network device configures two PDSCH-related configurations (for example, PDSCH-Config and PDSCH-Config1). The correspondence between the two configurations for PDSCH and the two CORESET/Search space groups can have the following options:

1) The correspondence can be directly stipulated by a protocol. For example, a new PDCCH configuration corresponds to a new PDSCH configuration, or the correspondence is determined according to the positions of the PDCCH configuration information and PDSCH information in the configuration signaling, or the correspondence is determined according to the name fields of the PDCCH configuration information and PDSCH information in the configuration information.

2) The PDCCH configuration carries information, indicating the PDSCH configuration information which a CORESET/Search space group corresponds to.

3) The PDSCH configuration carries information, indicating the PDCCH configuration information which a CORESET/Search space group corresponds to.

4) The network indicates the correspondence between PDCCH configuration and PDSCH configuration in the BWP configuration information.

In options 2)-4), when there is no relevant indication (or when some indications are not available), a default correspondence can be adopted.

In embodiments of the present disclosure, a network device sends configuration signaling to a terminal device, and the configuration signaling includes multiple sets of configuration information for a first type of channel, and/or a correspondence between the multiple sets of configuration information for the first type of channel and at least one set of configuration information for a second type of channel. In this way, the first type of channel can be transmitted based on the multiple sets of configuration information, and accordingly simultaneous transmission of the first type of channel by multiple TRPs (or multiple beams or multiple antenna panels) can be implemented.

Figure 5:
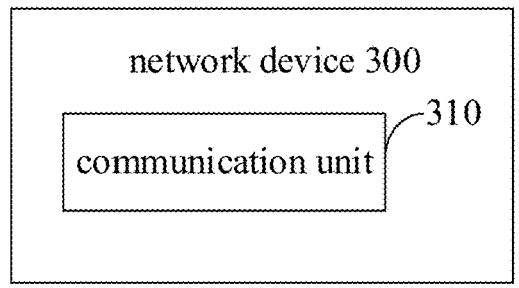
FIG. 5 is a schematic block diagram of a network device according to an embodiment of the present disclosure.

FIG. 5 is a schematic block diagram of a network device 300 according to an embodiment of the present disclosure. As shown in FIG. 5, the network device 300 includes a communication unit 310.

The communication unit 310 is configured to send configuration signaling to a terminal device, wherein the configuration signaling includes multiple sets of configuration information for a first type of channel, and/or a correspondence between the multiple sets of configuration information for the first type of channel and at least one set of configuration information for a second type of channel.

In some embodiments of the present disclosure, the first type of channel is a Physical Downlink Control Channel (PDCCH), and each of the multiple sets of configuration information includes at least one of the following: a search space/control resource set group which a search space/control resource set for the PDCCH belongs to; or a HARQ process group corresponding to the PDCCH.

In some embodiments of the present disclosure, numbers of the multiple sets of configuration information and search space/control resource set groups are equal, and different sets of configuration information indicate different search space/control resource set groups.

In some embodiments of the present disclosure, each search space/control resource set group is used to send one uplink grant and/or one downlink grant.

In some embodiments of the present disclosure, one search space/control resource set group is associated with one HARQ process group.

In some embodiments of the present disclosure, one search space/control resource set group is associated with one piece of scrambling information used to scramble PDSCH and/or PUSCH.

In some embodiments of the present disclosure, the first type of channel is a Physical Downlink Shared Channel (PDSCH) or a Physical Uplink Shared Channel (PUSCH), wherein each of the multiple sets of configuration information includes scrambling information used to transmit the PDSCH or PUSCH.

In some embodiments of the present disclosure, the scrambling information is used to determine an initial value of a scrambling sequence used to transmit the PDSCH or PUSCH.

In some embodiments of the present disclosure, the multiple sets of configuration information are carried in multiple configuration domains, and each of the configuration domains is used to carry one set of configuration information.

In some embodiments of the present disclosure, the multiple sets of configuration information are carried in one configuration domain.

In some embodiments of the present disclosure, the configuration domain is a PDSCH-configuration domain, a PDSCH-common configuration domain, a PDCCH-configuration domain, a PDCCH-common configuration domain, PUSCH-configuration domain, a PUSCH-common configuration domain, a PUCCH-configuration domain, or a PUCCH-common configuration domain.

In some embodiments of the present disclosure, the configuration signaling indicates the correspondence by positions of the multiple sets of configuration information for the first type of channel in the configuration signaling and positions of the at least one set of configuration information for the second type of channel in the configuration signaling.

In some embodiments of the present disclosure, the configuration signaling indicates the correspondence by name fields of the multiple sets of configuration information for the first type of channel in the configuration signaling and a name field of the at least one set of configuration information for the second type of channel in the configuration signaling.

In some embodiments of the present disclosure, the configuration signaling indicates configuration information for the second type of channel by carrying or not carrying a bit and/or a value of the bit in configuration information for the first type of channel.

In some embodiments of the present disclosure, the configuration signaling includes a dedicated domain dedicated to indicating the correspondence.

In some embodiments of the present disclosure, the correspondence includes one or more of the following: a correspondence between multiple sets of configuration information for PDCCH and multiple sets of configuration information for PDSCH; a correspondence between multiple sets of configuration information for PDCCH and one set of configuration information for PDSCH; a correspondence between one set of configuration information for PDCCH and multiple sets of configuration information for PDSCH; a correspondence between multiple sets of configuration information for PDCCH and multiple sets of configuration information for PUSCH; a correspondence between multiple sets of configuration information for PDCCH and one set of configuration information for PUSCH; a correspondence between one set of configuration information for PDCCH and multiple sets of configuration information for PUSCH; a correspondence between multiple sets of configuration information for PDCCH and multiple sets of configuration information for PUCCH; a correspondence between multiple sets of configuration information for PDCCH and one set of configuration information for PUCCH; or a correspondence between one set of configuration information for PDCCH and multiple sets of configuration information for PUCCH.

In some embodiments of the present disclosure, multiple beams, multiple Transmission Reception Points (TRPs), or multiple antenna panels are used to implement transmission or reception of the first type of channel based on the multiple sets of configuration information.

In some embodiments of the present disclosure, a single carrier is used to implement transmission or reception of the first type of channel based on the multiple sets of configuration information.

In some embodiments of the present disclosure, the configuration signaling is configuration signaling for a specific Bandwidth Part (BWP).

It should be understood that the network device 300 may correspond to the network device in the method 200, and can implement the corresponding operations implemented by the network device in the method 200. For the sake of brevity, details are not described herein again.

Figure 6:
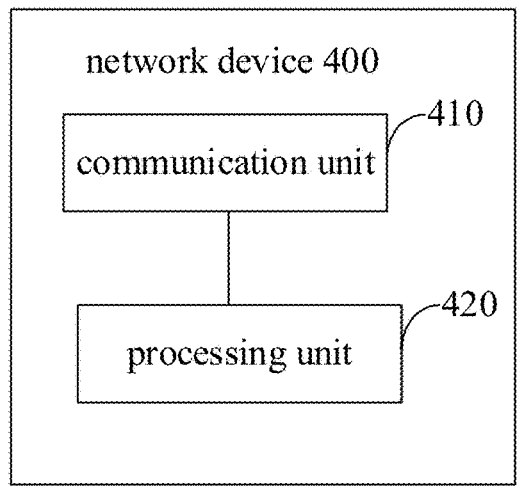
FIG. 6 is a schematic block diagram of a terminal device according to an embodiment of the present disclosure.

FIG. 6 is a schematic block diagram of a terminal device 400 according to an embodiment of the present disclosure. As shown in FIG. 6, the terminal device 400 includes a communication unit 410.

The communication unit 410 is configured to receive configuration signaling sent from a network device, wherein the configuration signaling includes multiple sets of configuration information for a first type of channel, and/or a correspondence between the multiple sets of configuration information for the first type of channel and at least one set of configuration information for a second type of channel; and send and/or receive the first type of channel and/or the second type of channel according to the configuration signaling.

In some embodiments of the present disclosure, the first type of channel is a Physical Downlink Control Channel (PDCCH), and each of the multiple sets of configuration information includes at least one of the following: a search space/control resource set group which a search space/control resource set for the PDCCH belongs to; or a HARQ process group corresponding to the PDCCH.

In some embodiments of the present disclosure, numbers of the multiple sets of configuration information and search space/control resource set groups are equal, and different sets of configuration information indicate different search space/control resource set groups.

In some embodiments of the present disclosure, each search space/control resource set group is used to send one uplink grant and/or one downlink grant.

In some embodiments of the present disclosure, the communication unit 410 is further configured to: when the terminal device detects one downlink (DL) grant in each search space/control resource set group, stop DL grant detection in the each search space/control resource set group; and/or when the terminal device detects one uplink (UL) grant in each search space/control resource set group, stop UL grant detection in the each search space/control resource set group.

In some embodiments of the present disclosure, one search space/control resource set group is associated with one HARQ process group.

In some embodiments of the present disclosure, as shown in FIG. 6, the terminal device 400 further includes a processing unit 420.

The processing unit 420 is configured to, when Downlink Control Information (DCI) is detected in the one search space/control resource set group, determine that a process indicated by a process number in the DCI belongs to the one HARQ process group associated with the search space/control resource set group.

In some embodiments of the present disclosure, one search space/control resource set group is associated with one piece of scrambling information used to scramble PDSCH or PUSCH.

In some embodiments of the present disclosure, as shown in FIG. 6, the terminal device 400 further includes a processing unit 420.

The processing unit 420 is configured to, when Downlink Control Information (DCI) is detected in the one search space/control resource set group, determine that PDSCH or PUSCH scheduled by the DCI is scrambled by the one piece of scrambling information associated with the one search space/control resource set group.

In some embodiments of the present disclosure, the first type of channel is a Physical Downlink Shared Channel (PDSCH) or multiple Physical Uplink Shared Channels (PUSCHs), wherein each of the multiple sets of configuration information includes scrambling information used to transmit each PDSCH or PUSCH.

In some embodiments of the present disclosure, the scrambling information is used to determine an initial value of a scrambling sequence used to transmit the PDSCH or PUSCH.

In some embodiments of the present disclosure, the multiple sets of configuration information are carried in multiple configuration domains, and each of the configuration domains is used to carry one set of configuration information.

In some embodiments of the present disclosure, the multiple sets of configuration information are carried in one configuration domain.

In some embodiments of the present disclosure, the configuration domain is a PDSCH-configuration domain, a PDSCH-common configuration domain, a PDCCH-configuration domain, a PDCCH-common configuration domain, PUSCH-configuration domain, a PUSCH-common configuration domain, a PUCCH-configuration domain, or a PUCCH-common configuration domain.

In some embodiments of the present disclosure, the configuration signaling indicates the correspondence by positions of the multiple sets of configuration information for the first type of channel in the configuration signaling and positions of the at least one set of configuration information for the second type of channel in the configuration signaling.

In some embodiments of the present disclosure, the configuration signaling indicates the correspondence by name fields of the multiple sets of configuration information for the first type of channel in the configuration signaling and a name field of the at least one set of configuration information for the second type of channel in the configuration signaling.

In some embodiments of the present disclosure, the configuration signaling indicates configuration information for the second type of channel by carrying or not carrying a bit and/or a value of the bit in configuration information for the first type of channel.

In some embodiments of the present disclosure, the configuration signaling includes a dedicated domain dedicated to indicating the correspondence.

In some embodiments of the present disclosure, the correspondence includes one or more of the following: a correspondence between multiple sets of configuration information for PDCCH and multiple sets of configuration information for PDSCH; a correspondence between multiple sets of configuration information for PDCCH and one set of configuration information for PDSCH; a correspondence between one set of configuration information for PDCCH and multiple sets of configuration information for PDSCH; a correspondence between multiple sets of configuration information for PDCCH and multiple sets of configuration information for PUSCH; a correspondence between multiple sets of configuration information for PDCCH and one set of configuration information for PUSCH; a correspondence between one set of configuration information for PDCCH and multiple sets of configuration information for PUSCH; a correspondence between multiple sets of configuration information for PDCCH and multiple sets of configuration information for PUCCH; a correspondence between multiple sets of configuration information for PDCCH and one set of configuration information for PUCCH; or a correspondence between one set of configuration information for PDCCH and multiple sets of configuration information for PUCCH.

In some embodiments of the present disclosure, multiple beams, multiple Transmission Reception Points (TRPs), or multiple antenna panels are used to implement transmission or reception of the first type of channel based on the multiple sets of configuration information.

In some embodiments of the present disclosure, a single carrier is used to implement transmission or reception of the first type of channel based on the multiple sets of configuration information.

In some embodiments of the present disclosure, the configuration signaling is configuration signaling for a specific Bandwidth Part (BWP).

It should be understood that the terminal device 400 may correspond to the terminal device in the method 200, and can implement the corresponding operations implemented by the terminal device in the method 200. For the sake of brevity, details are not described herein again.

Figure 7:
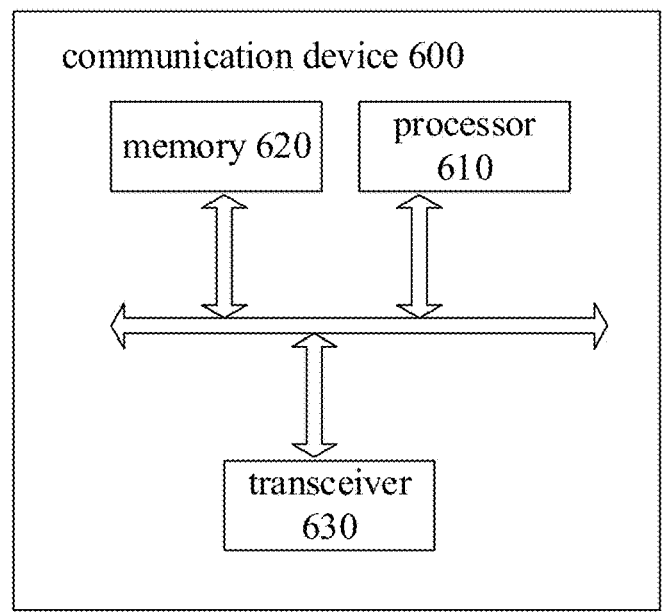
FIG. 7 is a schematic block diagram of a communication device according to an embodiment of the present disclosure.

FIG. 7 is a schematic structural diagram of a communication device 600 according to an embodiment of the present disclosure. The communication device 600 shown in FIG. 7 includes a processor 610, and the processor 610 may call and run a computer program from a memory to perform the method in embodiments of the present disclosure.

According to embodiments, as shown in FIG. 7, the communication device 600 may further include a memory 620. The processor 610 may call and run a computer program from the memory 620 to perform the method in embodiments of the present disclosure.

The memory 620 may be a separate device independent of the processor 610, or may be integrated in the processor 610.

According to embodiments, as shown in FIG. 7, the communication device 600 may further include a transceiver 630, and the processor 610 may control the transceiver 630 to communicate with other devices. Specifically, the transceiver may send information or data to other devices, or receive information or data sent by other devices.

The transceiver 630 may include a transmitter and a receiver. The transceiver 630 may further include one or more antennas.

According to embodiments, the communication device 600 may specifically be the network device according to an embodiment of the present disclosure, and the communication device 600 may implement the corresponding processes implemented by the network device in the method embodiments of the present disclosure. For brevity, details are not repeated here.

According to embodiments, the communication device 600 may specifically be the mobile terminal/terminal device in embodiments of the present disclosure, and the communication device 600 may implement the corresponding processes implemented by the mobile terminal/terminal device in the method embodiments of the present disclosure. For brevity, details are not repeated here.

Figure 8:
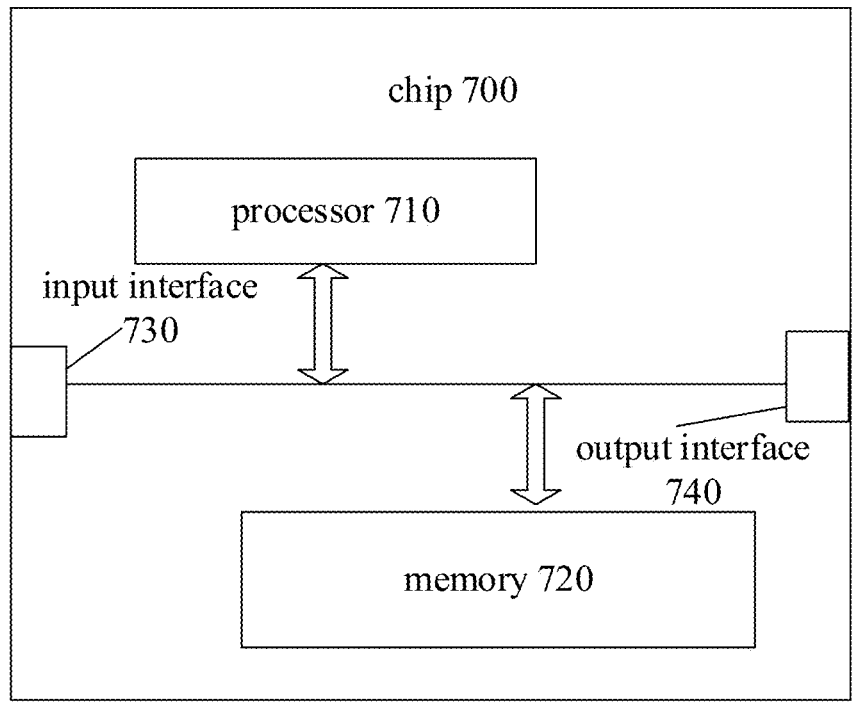
FIG. 8 is a schematic block diagram of a chip according to an embodiment of the present disclosure.

FIG. 8 is a schematic structural diagram of a chip according to an embodiment of the present disclosure. The chip 700 shown in FIG. 8 includes a processor 710, and the processor 710 can call and run a computer program from a memory to implement the method according to embodiments of the present disclosure.

According to embodiments, as shown in FIG. 8, the chip 700 may further include a memory 720. The processor 710 may call and run a computer program from the memory 720 to implement the method according to embodiments of the present disclosure.

The memory 720 may be a separate device independent of the processor 710, or may be integrated in the processor 710.

According to embodiments, the chip 700 may further include an input interface 730. The processor 710 may control the input interface 730 to communicate with other devices or chips, and specifically, the processor 710 can control the input interface to obtain information or data sent by other devices or chips.

According to embodiments, the chip 700 may further include an output interface 740. The processor 710 can control the output interface 740 to communicate with other devices or chips, and specifically, the processor 710 can control the output interface 740 to output information or data to other devices or chips.

According to embodiments, the chip can be applied to the network device in embodiments of the present disclosure, and the chip can implement the corresponding processes implemented by the network device in various methods according to embodiments of the present disclosure. For brevity, details are not repeated herein again.

According to embodiments, the chip can be applied to the mobile terminal/terminal device in embodiments of the present disclosure, and the chip can implement the corresponding processes implemented by the mobile terminal/terminal device in various methods according to embodiments of the present disclosure. For brevity, details are not repeated herein again.

It should be understood that the chip in the embodiments of the present disclosure may also be referred to as a system-level chip, a system chip, a chip system, or a system-on-chip, etc.

Figure 9:
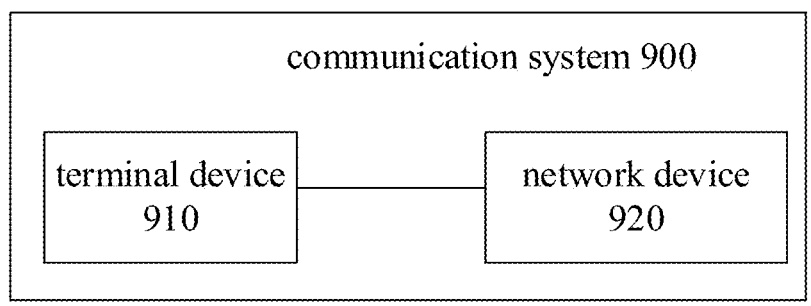
FIG. 9 is a schematic block diagram of a communication system according to an embodiment of the present disclosure.

FIG. 9 is a schematic block diagram of a communication system 900 according to an embodiment of the present disclosure. As shown in FIG. 9, the communication system 900 includes a terminal device 910 and a network device 920.

The terminal device 910 may be used to implement the corresponding functions implemented by the terminal device in the foregoing methods, and the network device 920 may be used to implement the corresponding functions implemented by the network device in the foregoing methods. For brevity, details are not repeated herein again.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the mobile terminal/terminal device in embodiments of the present disclosure, and the computer programs cause a computer to perform the corresponding processes implemented by the mobile terminal/terminal device in each method embodiment of the present disclosure. For brevity, repeated descriptions are omitted here.

An embodiment of the present disclosure provides a computer program product, including computer program instructions.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the mobile terminal/terminal device in embodiments of the present disclosure, and the computer program instructions cause a computer to perform the corresponding processes implemented by the mobile terminal/terminal device in each method embodiment of the present disclosure. For brevity, repeated descriptions are omitted here.

An embodiment of the present disclosure also provides a computer program.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the mobile terminal/terminal device in embodiments of the present disclosure, and when the computer program runs on a computer, the computer is caused to perform the corresponding processes implemented by the mobile terminal/terminal device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A-wireless communication method, comprising:
sending, by a network device, configuration signaling to a terminal device, wherein the configuration signaling comprises multiple sets of configuration information for a Physical Downlink Control Channel (PDCCH) and a correspondence between the multiple sets of configuration information for the PDCCH and at least one set of configuration information for a Physical Downlink Shared Channel (PDSCH), and wherein the configuration signaling is configuration signaling for a Bandwidth Part (BWP);
wherein each of the multiple sets of configuration information comprises: one Control Resource Set (CORESET) group to which a CORESET for the PDCCH belongs, wherein one CORESET group is associated with scrambling information used to determine an initial value of a scrambling sequence used to transmit the PDSCH;

wherein a single carrier is used to implement transmission of the PDCCH based on the multiple sets of configuration information.

2. The method according to claim 1, wherein:
each CORESET group is used to send a downlink grant.

3. The method according to claim 1, wherein:
the multiple sets of configuration information are carried in multiple configuration domains, and each of the configuration domains is used to carry one set of configuration information.

4. The method according to claim 1, wherein the correspondence comprises:
a correspondence between multiple sets of configuration information for PDCCH and multiple sets of configuration information for PDSCH.

5. The method according to claim 1, wherein the multiple sets of configuration information are carried in one configuration domain, and the configuration domain is a PDCCH-configuration domain.

6. A network device, comprising:
a memory for storing computer programs;
a transceiver; and
a processor;
wherein the processor is configured to execute the computer programs to control the transceiver to send configuration signaling to a terminal device,
wherein the configuration signaling comprises multiple sets of configuration information for a Physical Downlink Control Channel (PDCCH) and a correspondence between the multiple sets of configuration information for the PDCCH and at least one set of configuration information for a Physical Downlink Shared Channel (PDSCH), and wherein the configuration signaling is configuration signaling for a Bandwidth Part (BWP);
wherein each of the multiple sets of configuration information comprises: one Control Resource Set (CORESET) group to which a CORESET for the PDCCH belongs, wherein one CORESET group is associated with scrambling information used to determine an initial value of a scrambling sequence used to transmit the PDSCH;
wherein a single carrier is used to implement transmission of the PDCCH based on the multiple sets of configuration information.

7. The network device according to claim 6, wherein:
each CORESET group is used to send a downlink grant.

8. The network device according to claim 6, wherein the multiple sets of configuration information are carried in multiple configuration domains, and each of the configuration domains is used to carry one set of configuration information.

9. The network device according to claim 6, wherein the correspondence comprises:
a correspondence between multiple sets of configuration information for PDCCH and multiple sets of configuration information for PDSCH.

10. The network device according to claim 6, wherein the multiple sets of configuration information are carried in one configuration domain, and the configuration domain is a PDCCH-configuration domain.

11. A wireless communication method, comprising:
receiving, by a terminal device, configuration signaling sent from a network device, wherein the configuration signaling comprises multiple sets of configuration information for a Physical Downlink Control Channel (PDCCH) and a correspondence between the multiple sets of configuration information for the PDCCH and at least one set of configuration information for a Physical Downlink Shared Channel (PDSCH), and wherein the configuration signaling is configuration signaling for a Bandwidth Part (BWP); and
receiving the PDCCH and/or the PDSCH according to the configuration signaling;
wherein each of the multiple sets of configuration information comprises: one Control Resource Set (CORESET) group to which a CORESET for the PDCCH belongs, wherein one CORESET group is associated with scrambling information used to determine an initial value of a scrambling sequence used to transmit the PDSCH;
wherein a single carrier is used to implement reception of the PDCCH based on the multiple sets of configuration information.

12. The method according to claim 11, wherein each CORESET group is used to send a downlink grant.

13. The method according to claim 11, wherein the multiple sets of configuration information are carried in multiple configuration domains, and each of the configuration domains is used to carry one set of configuration information.

14. The method according to claim 11, wherein the multiple sets of configuration information are carried in one configuration domain, and the configuration domain is a PDCCH-configuration domain.

15. The method according to claim 11, wherein the correspondence comprises:
a correspondence between multiple sets of configuration information for PDCCH and multiple sets of configuration information for PDSCH.

16. A terminal device, comprising:
a memory for storing computer programs;
a transceiver; and
a processor;
wherein the processor is configured to execute the computer programs to control the transceiver to:
receive configuration signaling sent from a network device, wherein the configuration signaling comprises multiple sets of configuration information for a Physical Downlink Control Channel (PDCCH), and a correspondence between the multiple sets of configuration information for the PDCCH and at least one set of configuration information for a Physical Downlink Shared Channel (PDSCH), and wherein the configuration signaling is configuration signaling for a Bandwidth Part (BWP); and
receive the PDCCH and/or the PDSCH according to the configuration signaling;
wherein each of the multiple sets of configuration information comprises: one Control Resource Set (CORESET) group to which a CORESET for the PDCCH belongs, wherein one CORESET group is associated with scrambling information used to determine an initial value of a scrambling sequence used to transmit the PDSCH;
wherein a single carrier is used to implement reception of the PDCCH based on the multiple sets of configuration information.

17. The terminal device according to claim 16, wherein each CORESET group is used to send a downlink grant.

18. The terminal device according to claim 16, wherein the multiple sets of configuration information are carried in multiple configuration domains, and each of the configuration domains is used to carry one set of configuration information.

19. The terminal device according to claim 16, wherein the multiple sets of configuration information are carried in one configuration domain, and the configuration domain is a PDCCH-configuration domain.

20. The terminal device according to claim 16, wherein the correspondence comprises:
   a correspondence between multiple sets of configuration information for PDCCH and multiple sets of configuration information for PDSCH.

* * * * *